F. J. LUEDKE.
HARROW.
APPLICATION FILED MAY 10, 1920.

1,384,474.

Patented July 12, 1921.
2 SHEETS—SHEET 1.

Frank J. Luedke, INVENTOR.

BY

ATTORNEYS.

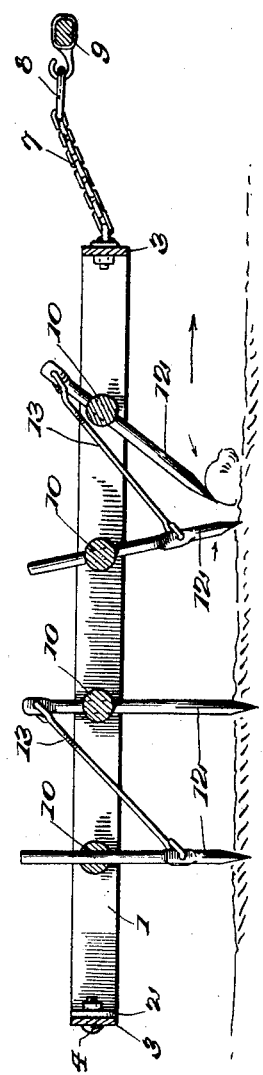
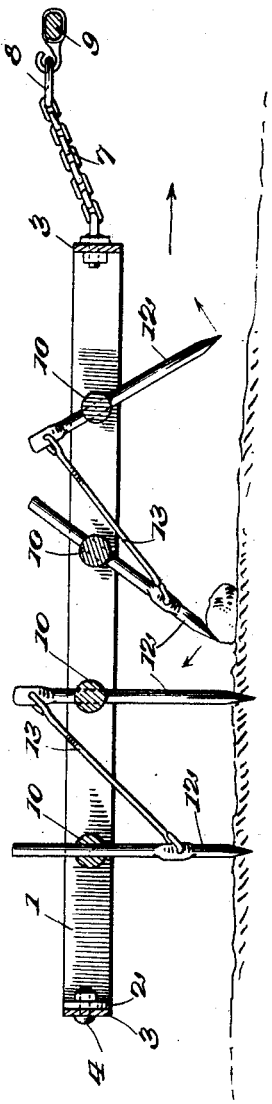

UNITED STATES PATENT OFFICE.

FRANK J. LUEDKE, OF SALTESE, MONTANA.

HARROW.

1,384,474. Specification of Letters Patent. Patented July 12, 1921.

Application filed May 10, 1920. Serial No. 380,327.

*To all whom it may concern:*

Be it known that I, FRANK J. LUEDKE, a citizen of the United States, residing at Saltese, in the county of Mineral and State of Montana, have invented certain new and useful Improvements in Harrows, of which the following is a specification.

This invention seeks to provide a harrow of simple and durable construction and which will be especially adapted to ride over large stones or other obstructions without damage to the harrow teeth. One embodiment of the invention is illustrated in the accompanying drawings and the invention resides in certain novel features which will be hereinafter fully described and then specifically pointed out in the appended claim.

In the drawings—

Figs. 3 and 4 are views similar to Fig. 2 showing the action of the teeth when an obstruction is encountered.

Figure 1:
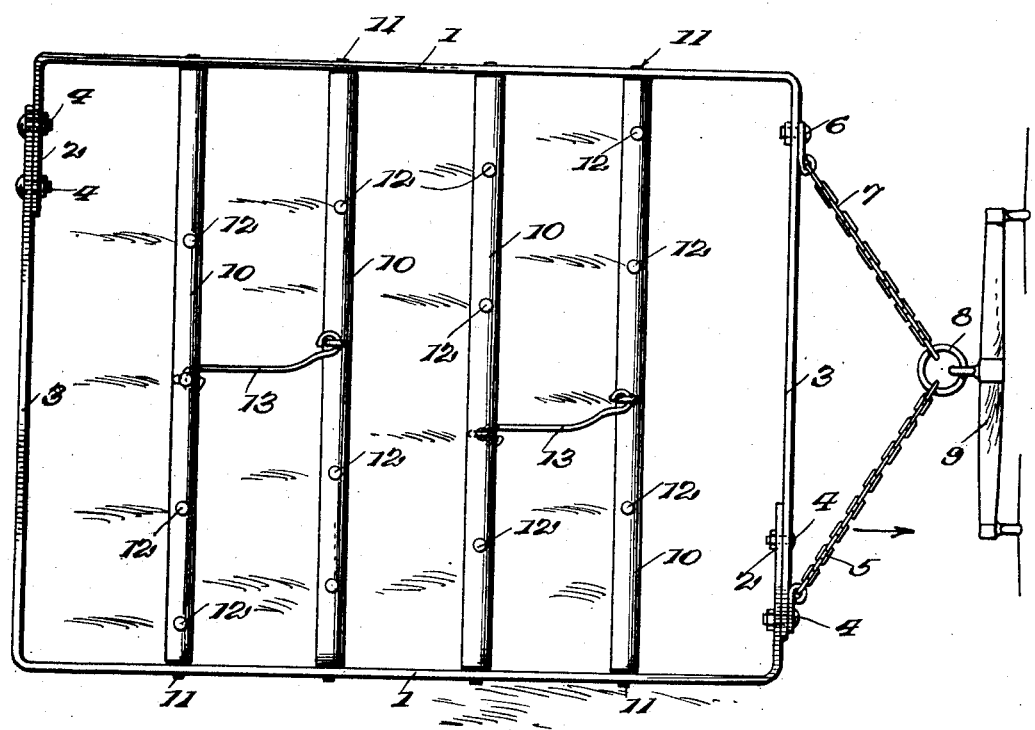
Figure 1 is a plan view of a harrow embodying my improvements.

In carrying out my invention, I employ a frame consisting of two similar L-shaped members, each having the extremity of its longer arm 1 turned laterally, as shown at 2, the said lateral branch or member overlapping the extremity of the shorter arm 3 of the other frame member. Securing bolts 4 are inserted through the overlapping portions of the frame members so that a rigid structure is produced and one of said bolts at the front of the frame serves also as means for securing one of the draft chains, 5, as clearly shown in Fig. 1. A similar bolt 6 is inserted through the arm 3 of the frame member to secure the coacting draft chain 7 and the said chains 5 and 7 have their front ends fitted upon a ring 8 in which the whiffletree 9 is engaged.

The tooth bars 10 may be solid or tubular as preferred and are provided at their ends with trunnions 11 which are rotatably engaged in suitable openings provided therefor in the sides of the frame so that the said bars may rock freely in the operation of the harrow. The harrow teeth 12 may be of any desired form but are preferably straight spikes as illustrated. Ordinarily, four bars will provide a harrow of sufficient size and in the drawings I have shown a harrow having four tooth bars. The first and second tooth bars are connected to rock simultaneously in opposite directions and the third and fourth tooth bars are likewise connected, the connection in the present illustration being a link 13 having its forward end pivotally attached to one of the teeth in the forward tooth bar above said bar and its rear end similarly attached to a tooth in the rear tooth bar and below the said bar.

Figure 2:
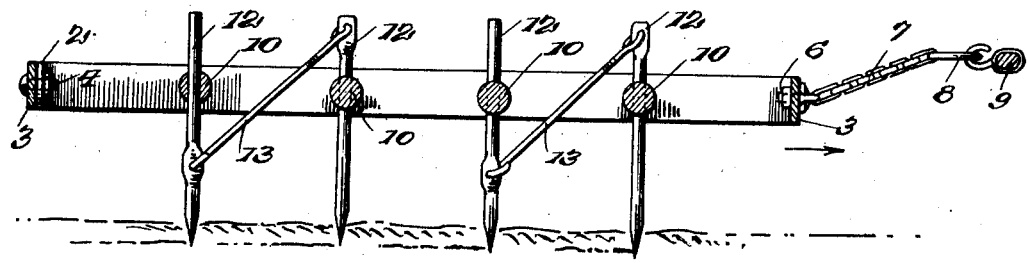
Fig. 2 is a longitudinal section of the same showing the normal working position of the harrow teeth.

As will be readily understood on reference to Fig. 2, when the harrow is being drawn over a field normally the teeth stand approximately vertical and tend to dig into the ground so that they will very effectually break up the surface soil and pulverize the same. The teeth of the forward row are prevented from swinging rearwardly to merely glide over the soil by the connection between them and the second row of teeth which causes the two rows to act in opposition so that when the lower ends of the forward teeth tend to swing rearwardly their upper ends move forwardly and pull upon the lower ends of the following teeth with the result that the teeth are held to their work and merely vibrate slightly so that the soil is thoroughly broken up and pulverized. Should the forward teeth, however, strike a large stone or other obstruction they will swing rearwardly under the impact, as indicated in Fig. 3, and the resulting forward movement of the upper ends of said teeth will exert a pull through the link 13 upon the next row of teeth at the lower ends thereof so that said teeth will be swung forward and will act upon the surface of the ground until they, in turn, reach the obstruction, the forward teeth in the interval riding over the obstruction without being damaged thereby. As the forward teeth clear the obstruction, they will again engage the ground and when the following teeth reach the obstruction they will in turn be swung rearwardly, as shown in Fig. 4, and will act through the connecting link 13 to swing the forward teeth forwardly. When the obstruction has been cleared by the second teeth, the weight of the teeth will return them to the working position. The harrow teeth may be secured rigidly in the tooth bars by any convenient or preferred means and it will be readily noted that the machine is exceedingly simple in the construction and arrangement of its parts so that while it is very durable it may be produced at a very low cost. Should a tooth bar be broken from any cause, the frame members may be readily separated sufficiently to permit the removal of the damaged bar and the substitution of a new one without requiring the provision of a new frame and without necessitating the services of an expert workman.

Having thus described the invention, what is claimed as new is:

A harrow comprising a frame consisting of two similar L-shaped members each having the extremity of its longitudinal arm provided with an inwardly turned portion overlapping the end of the transverse arm of the other member, fastening devices inserted through said overlapping portions, tooth bars mounted in the longitudinal arms of said L-shaped members, and harrow teeth secured in said tooth bars.

In testimony whereof I affix my signature.

FRANK J. LUEDKE. [L. S.]